US010612622B2

(12) United States Patent
Norwich

(10) Patent No.: US 10,612,622 B2
(45) Date of Patent: Apr. 7, 2020

(54) MAGNETIC ENGINE VIBRATION ISOLATOR

(71) Applicant: Schaeffler Technologies AG & Co. KG, Herzogenaurach (DE)

(72) Inventor: Victor Norwich, Wooster, OH (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 120 days.

(21) Appl. No.: 15/970,920

(22) Filed: May 4, 2018

(65) Prior Publication Data
US 2019/0338827 A1 Nov. 7, 2019

(51) Int. Cl.
*F16F 15/18* (2006.01)
*F02D 9/02* (2006.01)

(52) U.S. Cl.
CPC .............. *F16F 15/18* (2013.01); *F02D 9/02* (2013.01); *F16F 2222/06* (2013.01)

(58) Field of Classification Search
CPC ........ F16F 15/18; F16F 2222/06; F16F 15/03; F16F 15/22; F02D 9/02
See application file for complete search history.

(56) References Cited

U.S. PATENT DOCUMENTS

| | | | | |
|---|---|---|---|---|
| 5,287,518 A * | 2/1994 | Miller | ............... | F02B 63/04 310/168 |
| 6,626,138 B2 * | 9/2003 | Sayama | ............... | B60K 6/24 123/149 R |
| 7,466,052 B2 * | 12/2008 | Rozmus | ............... | F16C 29/045 310/90 |
| 8,944,024 B2 * | 2/2015 | Florea | ............... | F16C 9/02 123/198 R |
| 10,181,769 B2 * | 1/2019 | Schuttenbach Von | ...... | F02B 63/04 |
| 2002/0088424 A1 * | 7/2002 | Sayama | ............... | B60K 6/24 123/192.2 |
| 2003/0051679 A1 * | 3/2003 | Iwata | ............... | B60K 6/24 123/41.31 |
| 2010/0288214 A1 * | 11/2010 | Pelmear | ............... | F02B 77/14 123/41.86 |
| 2012/0032441 A1 * | 2/2012 | Engineer | ............... | F02B 63/04 290/31 |
| 2016/0315523 A1 * | 10/2016 | Schuttenbach Von | ...... | F02B 63/04 |

FOREIGN PATENT DOCUMENTS

JP          09182371 A    *    7/1997

\* cited by examiner

*Primary Examiner* — Hung Q Nguyen

(57) ABSTRACT

A magnetic engine vibration isolator, including: at least one block magnet arranged to be connected to a block for an internal combustion engine; and a crank magnet arranged to be connected to a crankshaft for the internal combustion engine. A magnetic engine vibration isolator, including: a first block magnet arranged to be connected to a block for an internal combustion engine and extend about an axis of rotation for a crankshaft for the internal combustion engine; a second block magnet arranged to be connected to the block and extend about the axis of rotation; and a crank magnet arranged to be connected to the crankshaft and disposed between the first block magnet and the second block magnet.

19 Claims, 15 Drawing Sheets

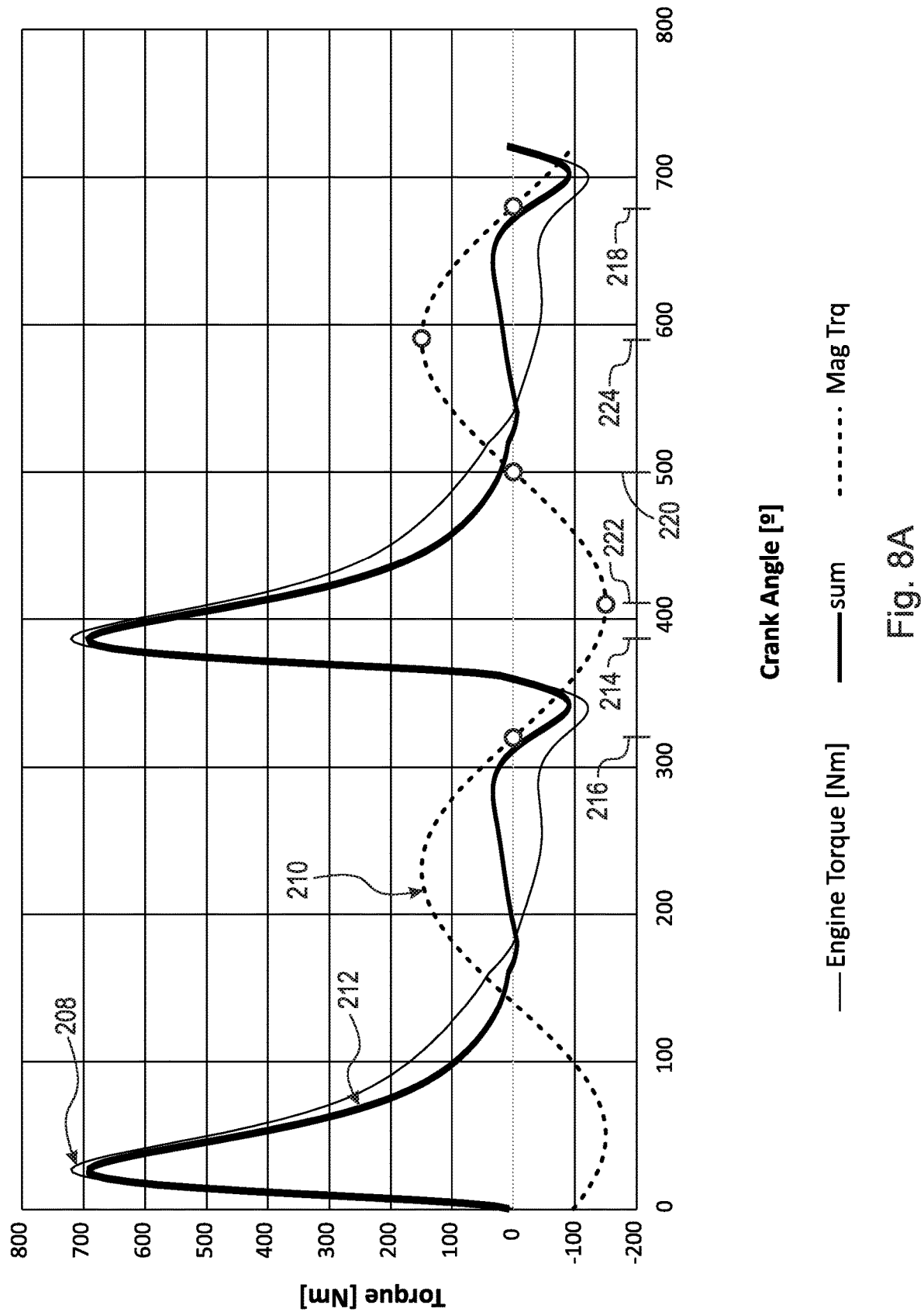

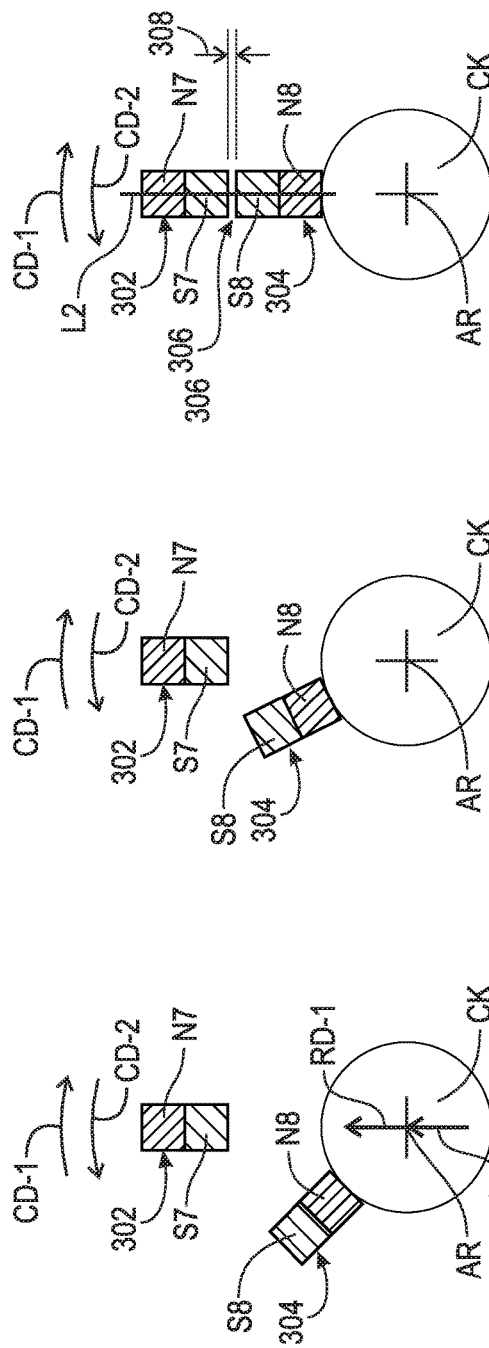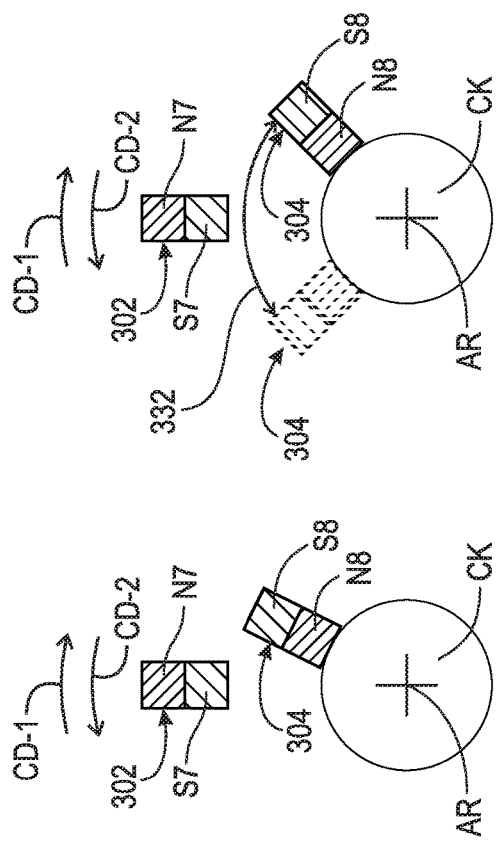

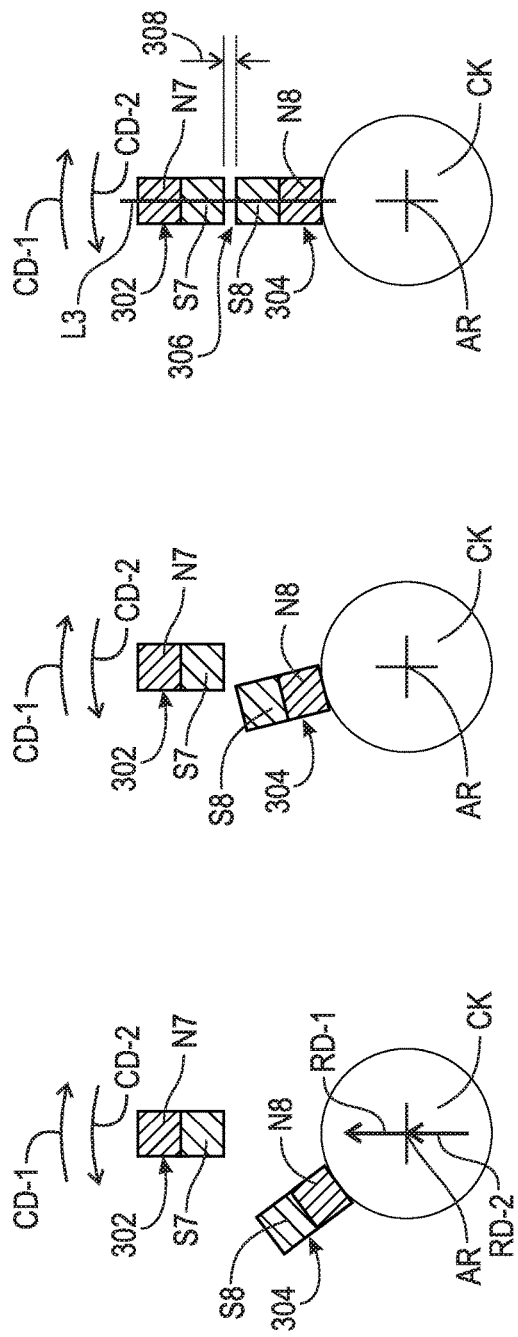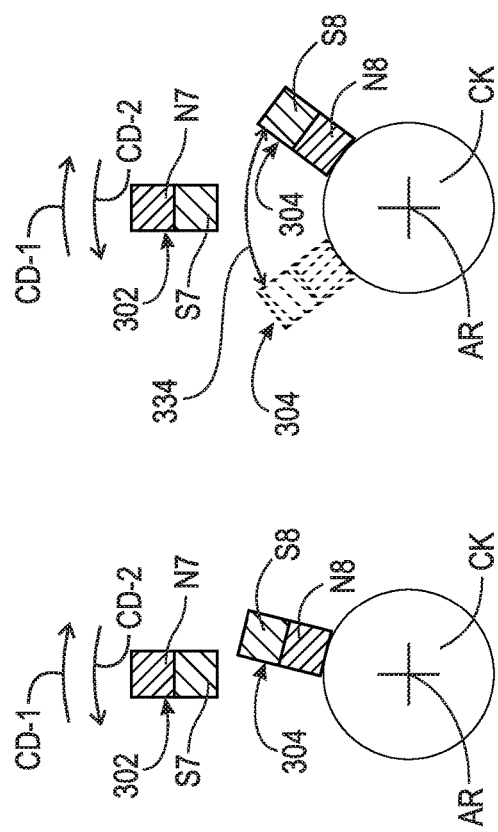

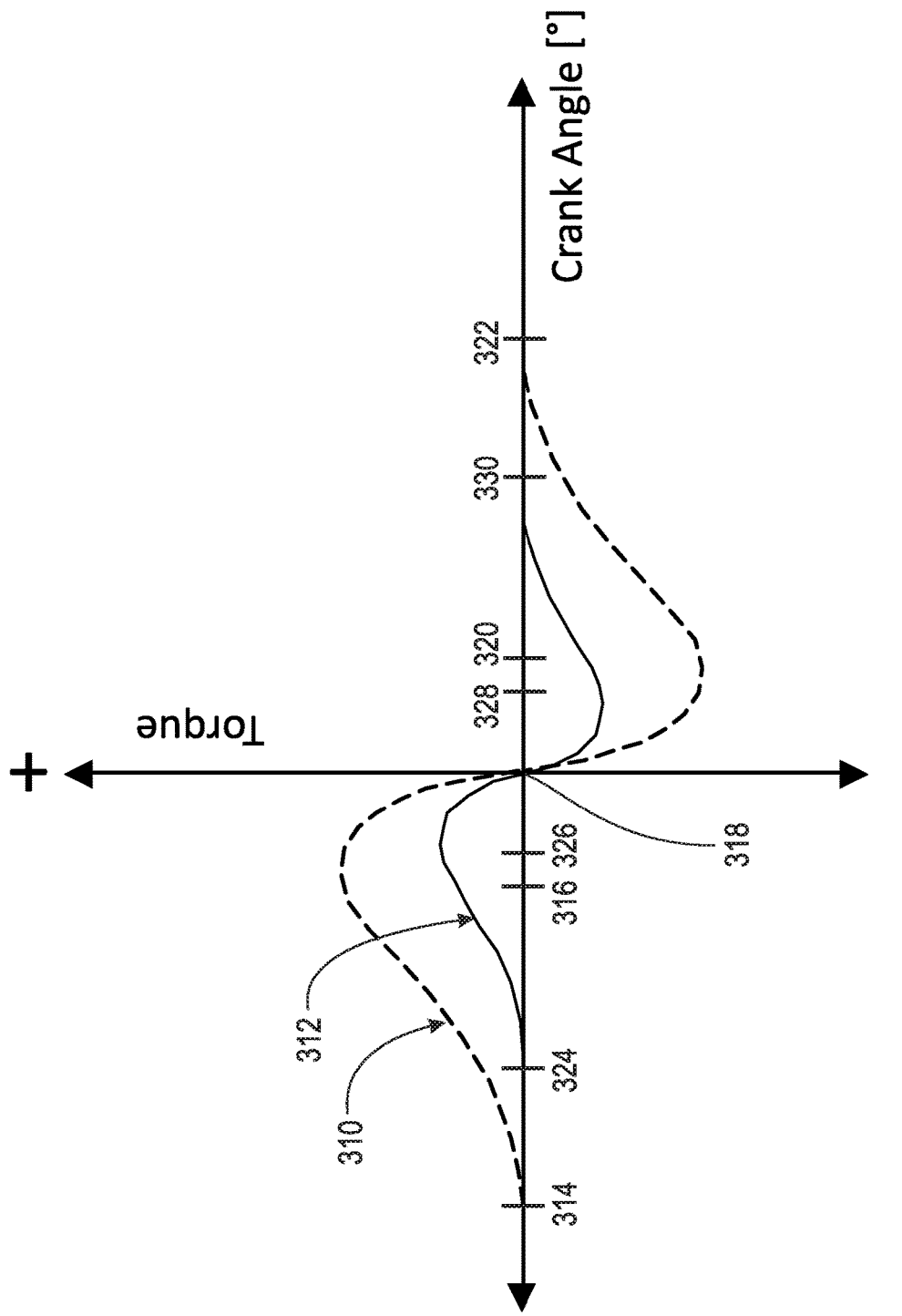

MAGNETIC ENGINE VIBRATION ISOLATOR

TECHNICAL FIELD

The present disclosure relates to a magnetic engine vibration isolator including radially aligned magnets arranged to be connected to a block for an internal combustion engine and a crankshaft for the engine. The isolator dampens torque from the engine using magnetic torque generated by the rotation between the aligned magnets.

BACKGROUND

Vibration from internal combustion engines with few cylinders (for example a two cylinder engine or a four cylinder turbo diesel engine) or firing less than all of the cylinders for the engine, for example firing only two cylinders in a four cylinder engine, can be too high to dampen with traditional mechanisms such as pendulum dampers within a crankshaft for the engine or a torque converter in a power train for the engine. Thus, it is impractical to implement deactivation applications, for example, deactivating all but two cylinders in an engine for a passenger vehicle. It is known to use the torque generated during peak torque events (cylinder firing) to generate electrical energy, and to store the electrical energy in capacitors. Then, during low torque events (between cylinder firing) the stored electrical energy is used to generate torque to put back in to the system. Such systems have inherent energy losses and inefficiencies due to the conversion of the mechanical energy of the engine to electrical energy, and the subsequent conversion of the electrical energy to mechanical energy.

SUMMARY

According to aspects illustrated herein, there is provided a magnetic engine vibration isolator, including: at least one block magnet arranged to be connected to a block for an internal combustion engine; and a crank magnet arranged to be connected to a crankshaft for the internal combustion engine.

According to aspects illustrated herein, there is provided a magnetic engine vibration isolator, including: a first block magnet arranged to be connected to a block for an internal combustion engine and extend about an axis of rotation for a crankshaft for the internal combustion engine; a second block magnet arranged to be connected to the block and extend about the axis of rotation; and a crank magnet arranged to be connected to the crankshaft; and disposed between the first block magnet and the second block magnet.

According to aspects illustrated herein, there is provided a magnetic engine vibration isolator, including: a block magnet arranged to be non-rotatably connected to a block for an internal combustion engine; and extend less than 360 degrees, in a circumferential direction, about an axis of rotation for a crankshaft for the internal combustion engine; and a crank magnet arranged to be non-rotatably connected to the crankshaft and extend less than 360 degrees, in the circumferential direction, about the axis of rotation.

BRIEF DESCRIPTION OF THE DRAWINGS

Various embodiments are disclosed, by way of example only, with reference to the accompanying schematic drawings in which corresponding reference symbols indicate corresponding parts, in which:

FIG. 8A is a graph showing engine torque, magnetic torque, and combined engine torque and magnetic torque for a full throttle condition;

FIGS. 10A through 10J are schematic front views of the magnetic engine vibration isolator shown in FIG. 9 in respective circumferential positions for a crankshaft for the internal combustion engine; and, FIG. 11 is a graph showing magnetic torque for the magnetic engine vibration isolator shown in FIG. 9.

DETAILED DESCRIPTION

At the outset, it should be appreciated that like drawing numbers on different drawing views identify identical, or curvedly similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
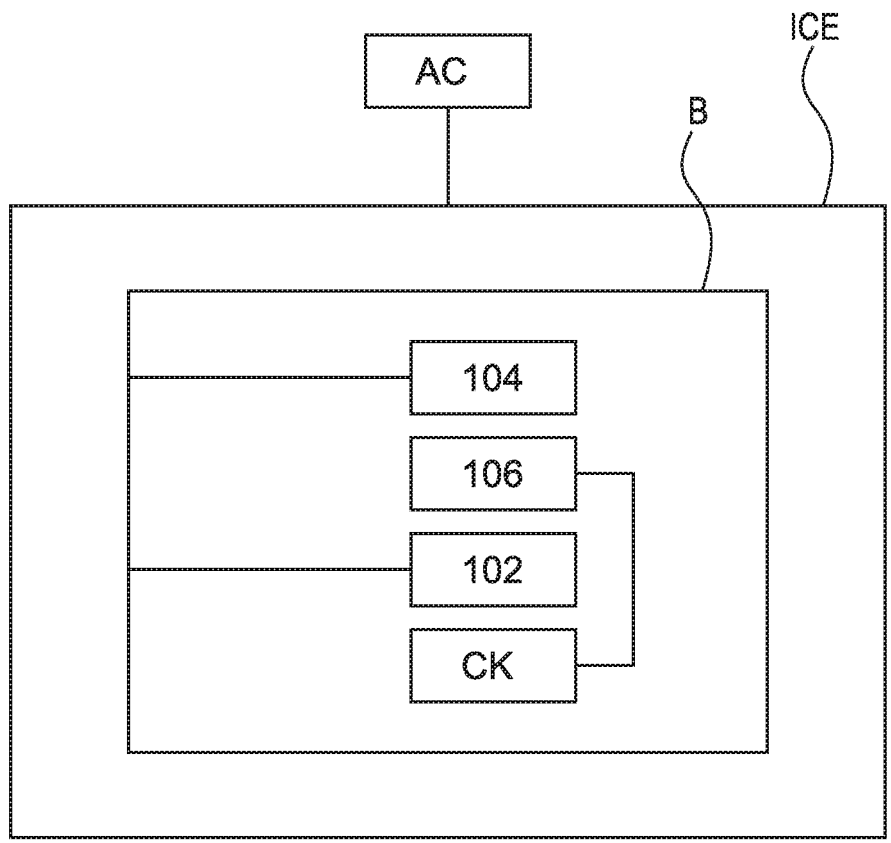
FIG. 1 is a block diagram of a magnetic engine vibration isolator in an engine block of an internal combustion engine.

FIG. 1 is a block diagram of magnetic engine vibration isolator 100 in an engine block of an internal combustion engine.

FIGS. 2A through 2D are schematic front view of magnetic engine vibration isolator 100 shown in FIG. 1 with two block magnets and respective circumferential positions for a crankshaft for the internal combustion engine.

Figure 2A:
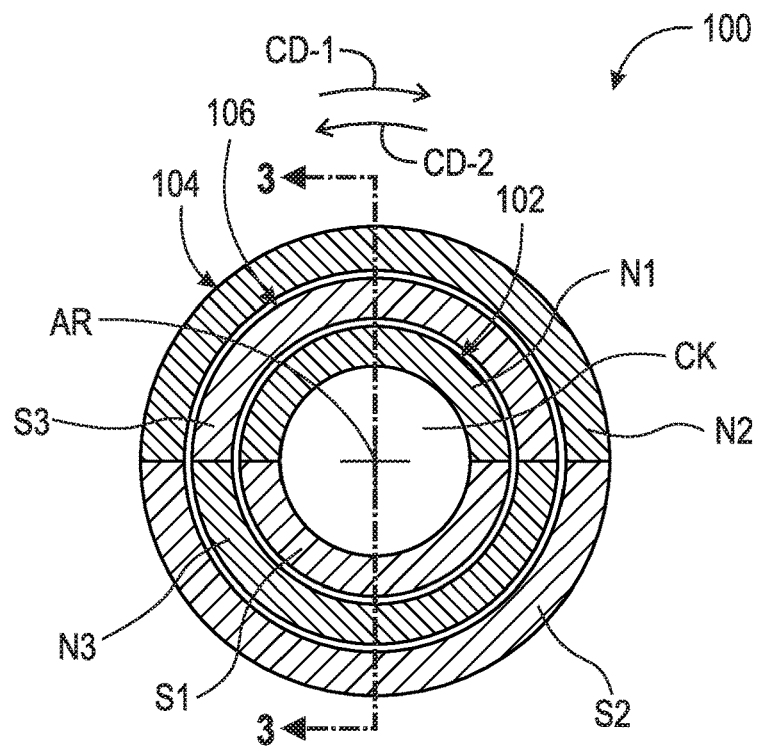
FIGS. 2A through 2D are schematic front view of the magnetic engine vibration isolator shown in FIG. 1 with two block magnets and respective circumferential positions for a crankshaft for the internal combustion engine.
Figure 2B:
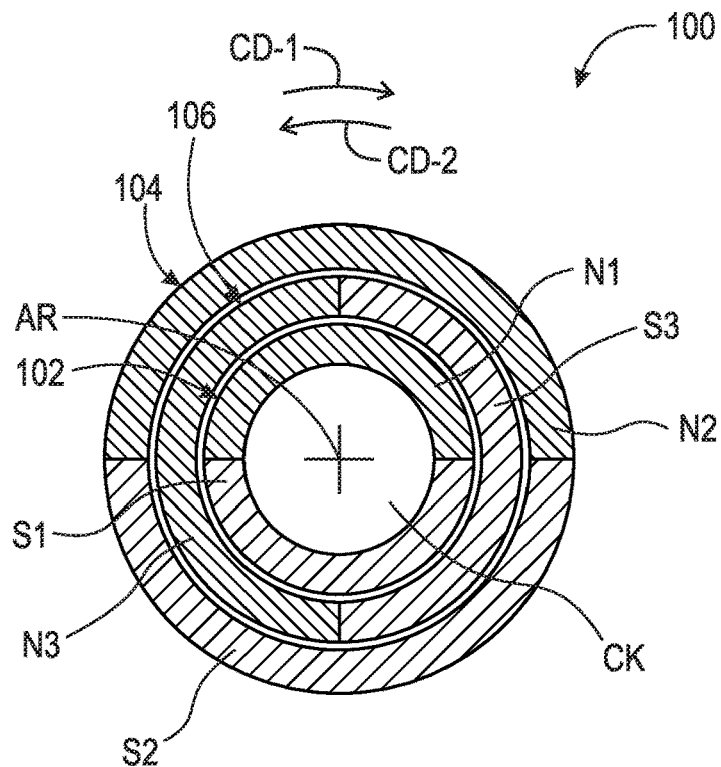
Figure 2C:
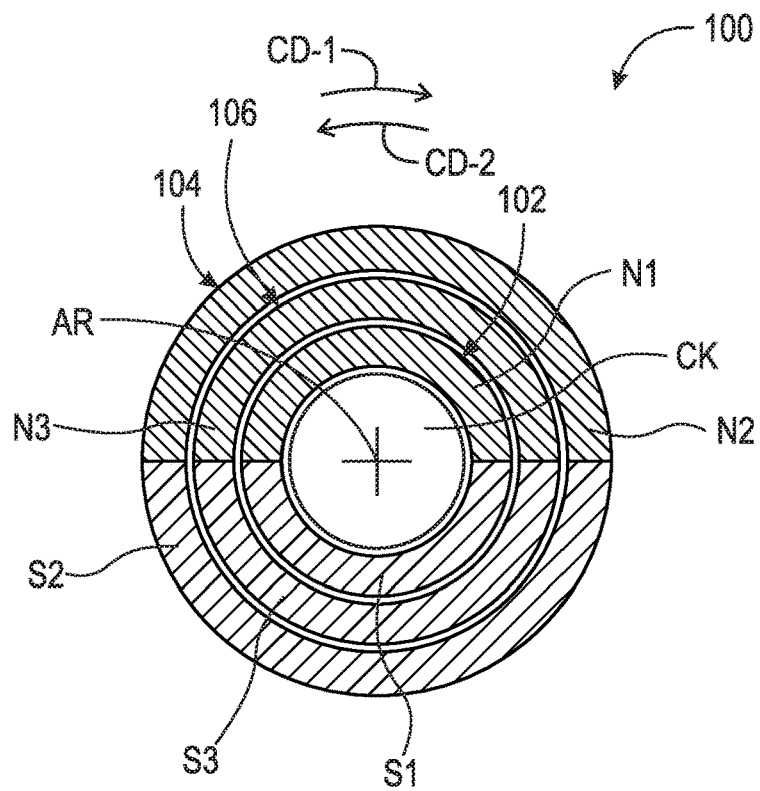
Figure 2D:
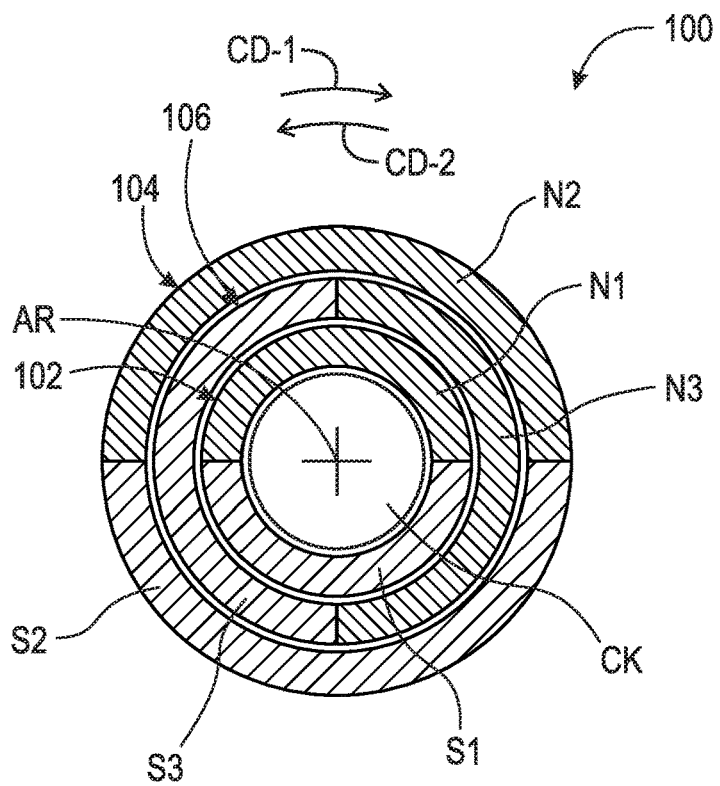
Figure 3:
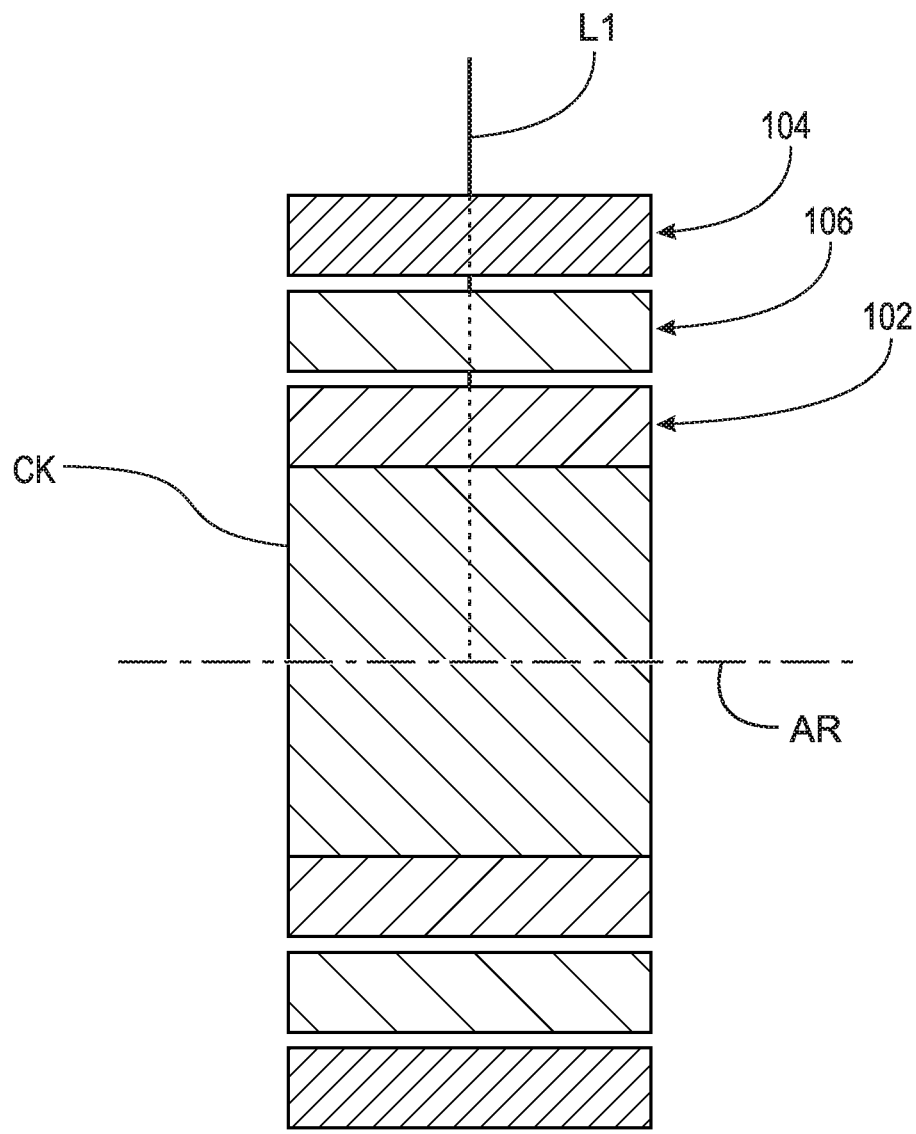
FIG. 3 is a cross-sectional view generally along line 3-3 in FIG. 2B.

FIG. 3 is a cross-sectional view generally along line 3-3 in FIG. 2B. The following should be viewed in light of FIGS. 1 through 3. In the example of FIGS. 1 through 3, isolator 100 includes: block magnet 102 arranged to be connected to block B for internal combustion engine ICE; block magnet 104 arranged to be connected to block B; and crank magnet 106 radially disposed between block magnet 102 and block magnet 104, and arranged to be connected to crankshaft CK for engine ICE. Engine ICE includes two or more cylinders.

At least respective portions of magnets 102, 104, and 106 are radially aligned. By "radially aligned" components, we mean that a line, for example, line L1, orthogonal to an axis of rotation for the components, for example axis of rotation AR for crankshaft CK, passes through the components, for example block magnet 102, block magnet 104, and crank magnet 106. In an example embodiment, respective entireties of block magnet 102, block magnet 104, and crank magnet 106 are radially aligned. In an example embodiment: block magnet 102, block magnet 104, and crank magnet 106 are permanent magnets; block magnet 102, block magnet 104, and crank magnet 106 include north poles N1, N3, and N3, respectively; and block magnet 102, block magnet 104, and crank magnet 106 include south poles+ S1, S2, and S3, respectively.

In the example of FIGS. 1 through 3, block magnet 102 and block magnet 104 are arranged to be non-rotatably connected to block B, and crank magnet 106 is arranged to be non-rotatably connected to crankshaft CK. By "non-rotatably connected" components, we mean that: the components are connected so that whenever one of the components rotates, all the components rotate; and relative rotation between the components is not possible. Radial and/or axial movement of non-rotatably connected components with respect to each other is possible, but not required.

In the example of FIGS. 1 through 3: block magnet 102, block magnet 104, and crank magnet 106 are each extend, or are disposed, 360 degrees about axis of rotation AR in circumferential direction CD-1. In the example of FIGS. 1 through 3, an entirety of north pole N1 and an entirety of north pole N2 are radially aligned. Thus, any line, such as line L1, orthogonal to axis AR and passing through one of north pole N1 or N2, passes through the other of north pole N1 or N2.

In an example embodiment (not shown), for one or more of magnets 102, 104, or 106 is disposed less than 360 degrees about axis AR.

In FIGS. 2A through 2D, crankshaft CK rotates in circumferential direction CD-1. With FIG. 2A as a starting point: crankshaft CK is rotated 90 degrees in direction CD-1 to produce FIG. 2B; crankshaft CK is rotated 180 degrees in direction CD-1 to produce FIG. 2C; and crankshaft CK is rotated 270 degrees in direction CD-1 to produce FIG. 2D.

Figure 4:
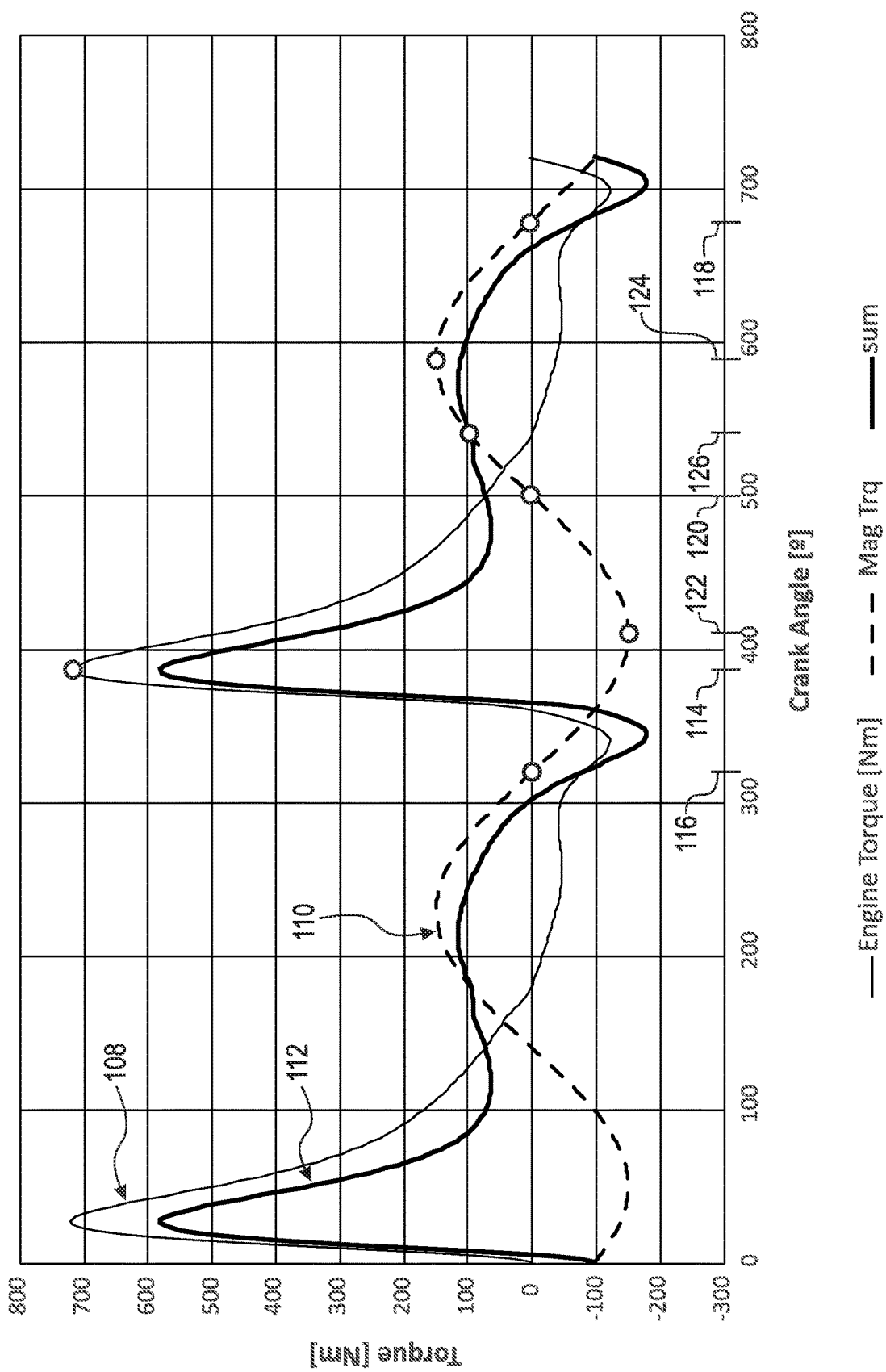
FIG. 4 is a graph showing engine torque, magnetic torque, and combined engine torque and magnetic torque for a full throttle condition.

FIG. 4 is graph showing engine torque, magnetic torque, and combined engine torque and magnetic torque for a full throttle condition. The following should be viewed in light of FIGS. 1 through 4. In FIG. 4: accelerator AC for engine ICE is in a full throttle position; torque is shown on the Y axis and the crank angle of crankshaft CK is shown on the X axis. FIG. 4 represents firing of only two cylinders of internal combustion engine ICE. As noted above, vibration from an internal combustion engine firing less than all of the cylinders for the engine, for example firing two cylinders in a four or six cylinder engine, can be too high to dampen with traditional mechanisms such as pendulum dampers within a crankshaft for the engine or a torque converter in a power train for the engine. Isolator 100 generates magnetic torque that cancels portions of engine torque and engine vibration associated with the firing, for example, of only two cylinders in a four or six cylinder engine.

In FIG. 4: curve 108 represents engine torque associated with firing of two cylinders in internal combustion engine ICE; curve 110 is a sinusoidal curve representing magnetic torque from isolator 100; and curve 112 represents the combination of curves 108 and 110. Engine torque associated with the firing of a cylinder in engine ICE reaches a peak at crank angle 114. The greatest magnitude of undesirable engine vibration is generated at crank angle 114.

The magnitude of curve 110 varies according to the rotational position of crankshaft CK and crank magnet 106 (block magnet 102 and block magnet 104 are fixed to block B and do not rotate with crankshaft CK). Sinusoidal curve 110 completes a cycle between crank angles 116 and 118. At crank angles 116, 118, and 120, curve 110 is zero. Crank angles 116 and 118 correspond to correspond to FIG. 2A, and crank angle 120 corresponds to FIG. 2C. Curve 110 reaches a negative peak at crank angle 122 and reaches a positive peak at crank angle 124.

Crank angles 122 and 124 are associated with FIGS. 2B and 2D, respectively. For example, to generate the maximum negative magnetic torque at crank angle 122, poles N1 and N2 of block magnets 102 and 104, respectively, resist, in direction CD-2, opposite direction CD-1, rotation of pole N3 of crank magnet 106, in direction CD-1, to the position shown in FIG. 2B, which resists rotation of crankshaft CK in direction CD-1. For example, poles N1 and N2 of block magnets 102 and 104, respectively, urge, in direction CD-1, rotation of pole N of crank magnet 106 to the position shown in FIG. 2D.

Thus: from crank angle 116 to crank angle 122, crank magnet 106 rotates from the position shown in FIG. 2A to the position shown in FIG. 2B; from crank angle 122 to crank angle 120, crank magnet 106 rotates form the position shown in FIG. 2B to the position shown in FIG. 2C; from crank angle 120 to crank angle 124, crank magnet 106 rotates form the position shown in FIG. 2C to the position shown in FIG. 2D; and from crank angle 124 to crank angle 118, crank magnet 106 rotates form the position shown in FIG. 2D to the position shown in FIG. 2A.

Curve 112 shows that the peak negative magnetic torque at crank angle 122 has significantly diminished the peak engine torque, in particular between crank angles 114 and 120. Testing has shown that the combined engine torque and magnetic torque generated by isolator 100 and represented by curve 112, results in a sixty percent reduction of second order engine vibration associated with the engine torque represented by curve 108.

Figure 5:
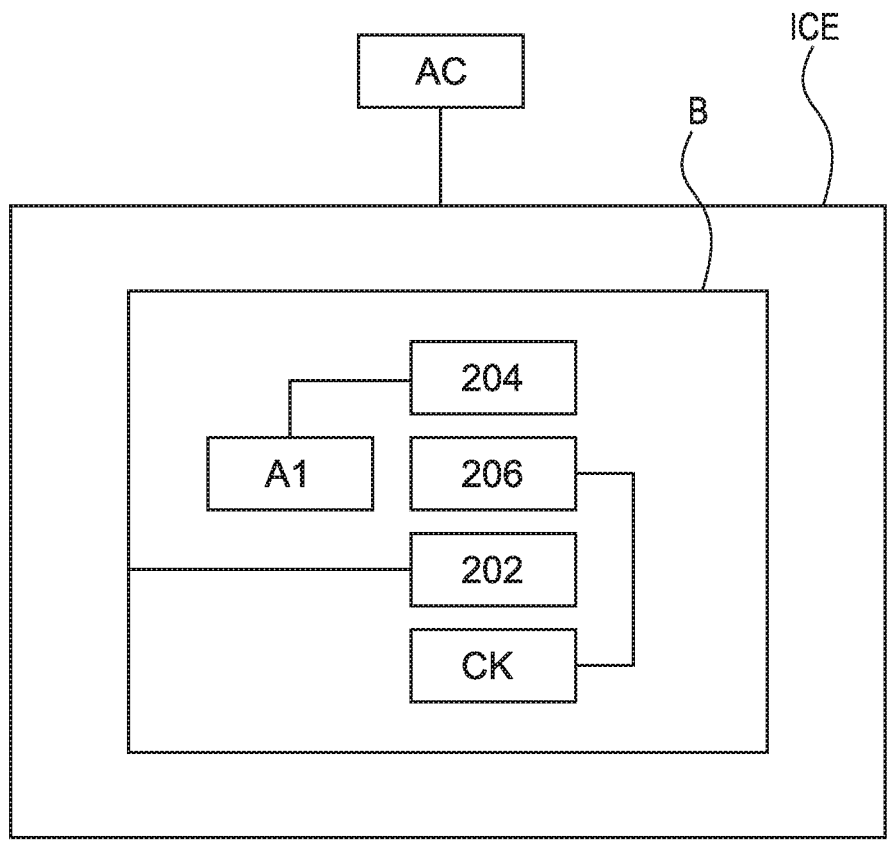
FIG. 5 is a block diagram of a magnetic engine vibration isolator in an engine block of an internal combustion engine.

FIG. 5 is a block diagram of a magnetic engine vibration isolator 200 in an engine block of an internal combustion engine.

Figure 6:
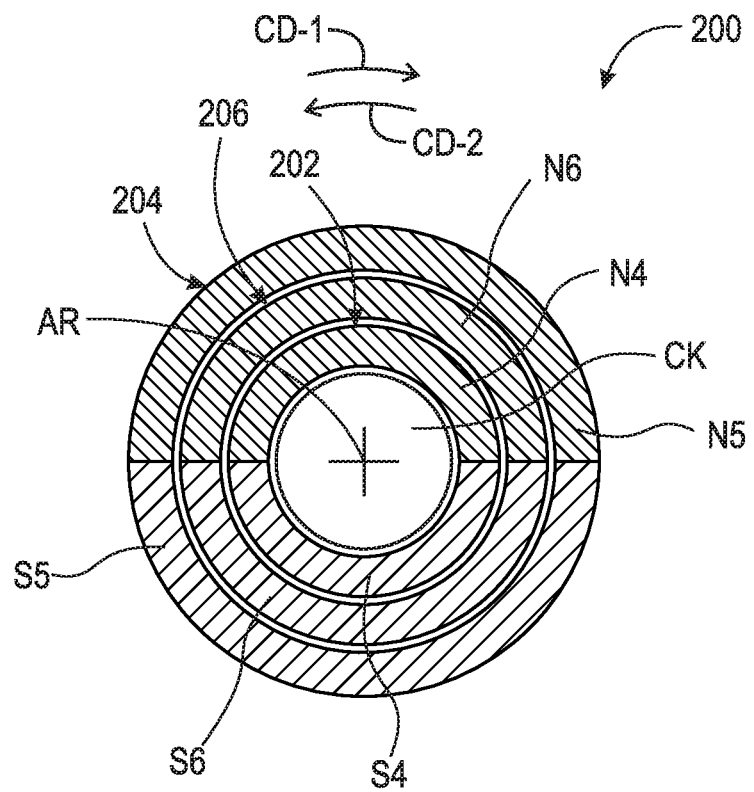
FIG. 6 is a front schematic front views of the magnetic engine vibration isolator shown in FIG. 5 for full radial alignment of block magnets
Figure 7A:
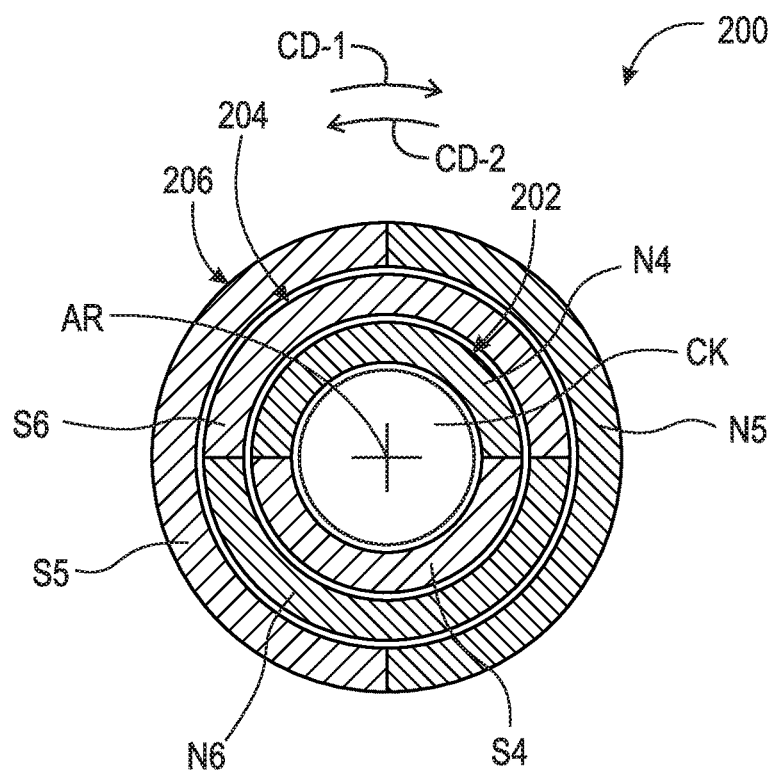
FIGS. 7A through 7D are schematic front views of the magnetic engine vibration isolator shown in FIG. 5 in respective circumferential positions for the crankshaft and for a ninety degree circumferential off-set of the block magnets.
Figure 7B:
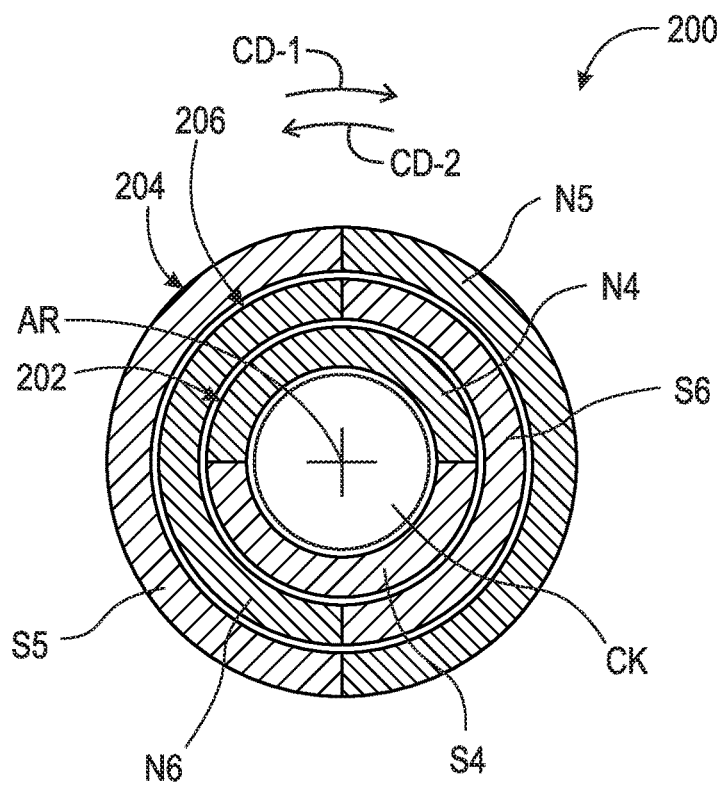
Figure 7C:
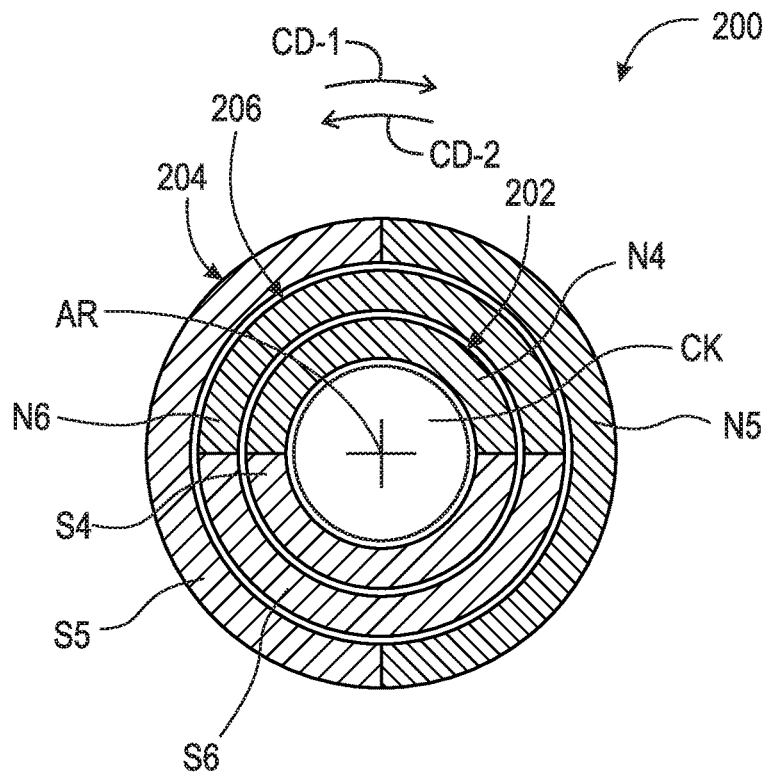
Figure 7D:
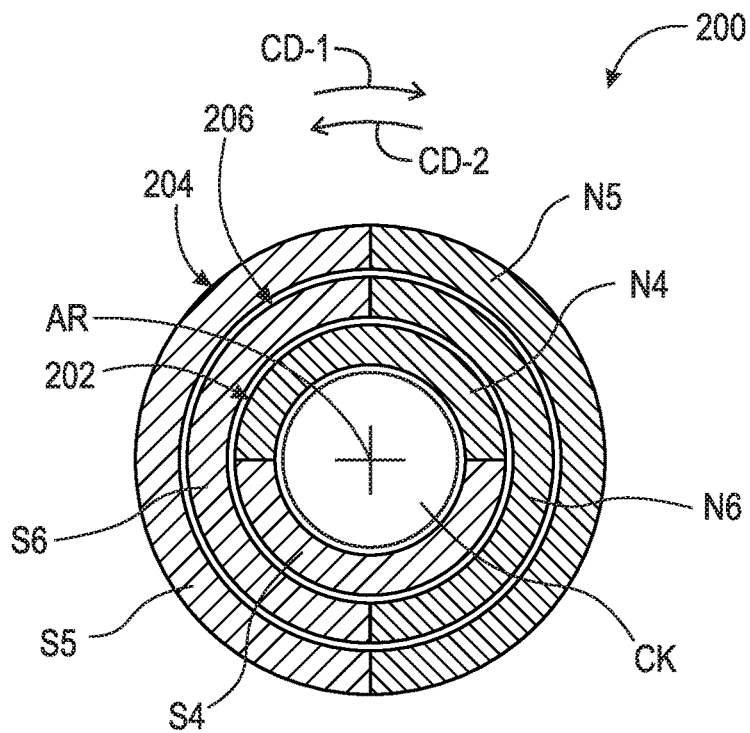

FIG. 6 is a front schematic front views of the magnetic engine vibration isolator shown in FIG. 5 for full radial alignment of block magnets.

FIGS. 7A through 7D are schematic front views of the magnetic engine vibration isolator shown in FIG. 5 in respective circumferential positions for the crankshaft and for a ninety-degree circumferential off-set of the block magnets. The following should be viewed in light of FIGS. 5 through 7D. In the example of FIGS. 5 through 7D, isolator 200 includes: block magnet 202 arranged to be connected to block B for internal combustion engine ICE; block magnet 204 arranged to be connected to block B; and crank magnet 206 radially disposed between block magnet 202 and block magnet 204, and arranged to be connected to crankshaft CK for engine ICE. At least respective portions of magnets 202, 204, and 206 are radially aligned. In an example embodiment, respective entireties of magnets 202, 204, and 206 are radially aligned. In an example embodiment: block magnet 202, block magnet 204, and crank magnet 206 are permanent magnets; block magnet 202, block magnet 204, and crank magnet 206 include north poles N4, N5, and N6, respectively; and block magnet 202, block magnet 204, and crank magnet 206 include south poles S4, S5, and S6, respectively.

In the example of FIGS. 5 through 7D: block magnet 202 is arranged to be non-rotatably connected to block B; block magnet 204 is arranged to be displaceable by actuator A1, with respect to axis AR and in circumferential direction CD-1 and/or circumferential direction CD-2; and crank magnet 206 is arranged to be non-rotatably connected to crankshaft CK. Actuator A1 can be any actuator known in the art. In the example of FIGS. 5 through 7D: block magnet 202, block magnet 204, and crank magnet 206 are each disposed 360 degrees about axis of rotation AR.

In the example of FIGS. 5 and 6: accelerator AC of engine ICE is at full throttle position; and actuator A1 has rotated block magnet 204 in direction CD-1 such that block magnet 204 is radially aligned with block magnet 202 (zero degree off-set). Note that the positions for magnets 202 and 204 in FIG. 6 are the same as the positions for magnets 102 and 104, respectively, in FIGS. 2A through 2D and there is no phase shift associated with a zero degree off-set. For FIG. 6, when the strengths of magnets 202, 204, and 206 are the same as the strengths of magnets 102, 104, and 106, respectively, FIG. 6 is the same as FIG. 4 when magnet 206 is rotated 360 degrees in direction CD-1.

In the example of FIGS. 5 and 7A through 7D, actuator A1 has rotated block magnet 204 ninety degrees (ninety degree off-set), from the position in FIG. 6, in direction CD-1 such only half of block magnet 204 is radially aligned with block magnet 202. With FIG. 7A as a starting point: crankshaft CK is rotated 90 degrees in direction CD-1 to produce FIG. 7B; crankshaft CK is rotated 180 degrees in direction CD-1 to produce FIG. 7C; and crankshaft CK is rotated 270 degrees in direction CD-1 to produce FIG. 7D.

FIG. 8A is a graph showing engine torque, magnetic torque, and combined engine torque and magnetic torque for a full throttle condition.

Figure 8B:
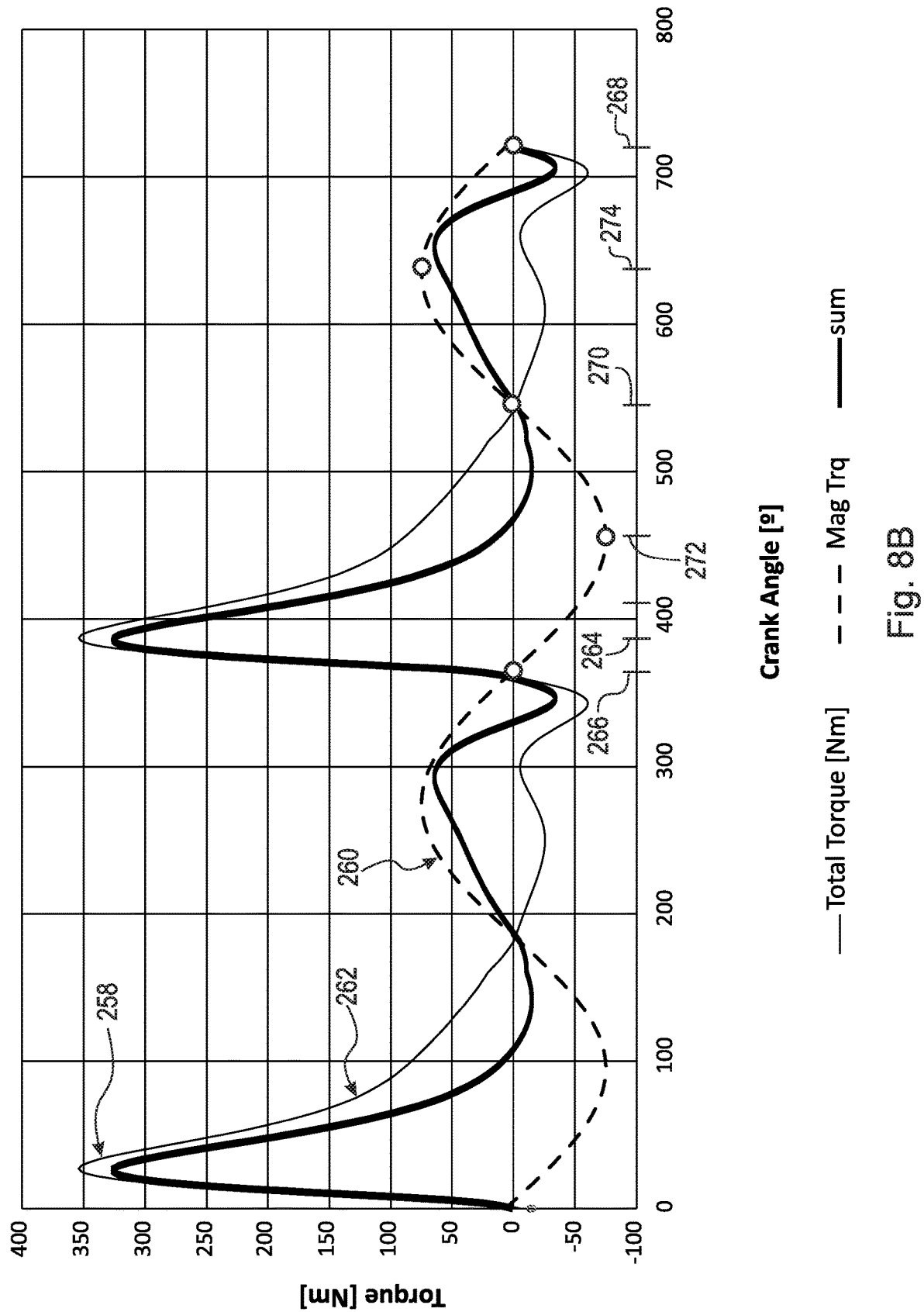
FIG. 8B is a graph showing engine torque, magnetic torque, and combined engine torque and magnetic torque for a half throttle condition.

FIG. 8B is a graph showing engine torque, magnetic torque, and combined engine torque and magnetic torque for a half throttle condition. The following should be viewed in light of FIGS. 5 through 8B. In FIGS. 8A and 8B, torque is shown on the Y axis and crank angle is shown on the X axis. FIGS. 8A and 8B represent firing of only two cylinders of internal combustion engine ICE and are based on FIGS. 7A through 7D. In FIG. 8A, accelerator AC for engine ICE is in a full throttle position. In FIG. 8B, accelerator AC for engine ICE is in a half throttle position. Isolator 200 generates magnetic torque that cancels portions of engine torque and engine vibration associated with the firing, for example, of only two cylinders in a four or six cylinder engine.

In FIG. 8A: curve 208 represents engine torque; 210 is a sinusoidal curve representing magnetic torque from isolator 200; and curve 212 represents the combination of curves 208 and 210. The magnitude and phase of the magnetic torque for isolator 200 is dependent on the circumferential position of block magnet 204 and the circumferential position of crank magnet 206 about axis AR (block magnet 202 is fixed and does not rotate with crankshaft CK). Engine torque peaks at crank angle 214. Sinusoidal curve 210 completes a cycle between crank angles 216 and 218. At crank angles 216, 218, and 220, curve 210 is zero. Crank angles 216 and 218 correspond to correspond to FIG. 7A, and crank angle 220 corresponds to FIG. 7C. Curve 210 reaches a negative peak at crank angle 222 and reaches a positive peak at crank angle 224. Crank angles 222 and 224 are associated with FIGS. 7B and 7D, respectively.

In FIG. 8B: curve 258 represents engine torque; curve 260 is a sinusoidal curve representing magnetic torque from isolator 200; and curve 262 represents the combination of curves 258 and 260. Engine torque peaks at crank angle 264. Sinusoidal curve 260 completes a cycle between crank angles 266 and 268. At crank angles 266, 268, and 270, curve 260 is zero. Crank angles 266 and 268 correspond to correspond to FIG. 7A, and crank angle 270 corresponds to FIG. 7C. Curve 260 reaches a negative peak at crank angle 272 and reaches a positive peak at crank angle 274. Crank angles 272 and 274 are associated with FIGS. 7B and 7D, respectively.

Figure 9:
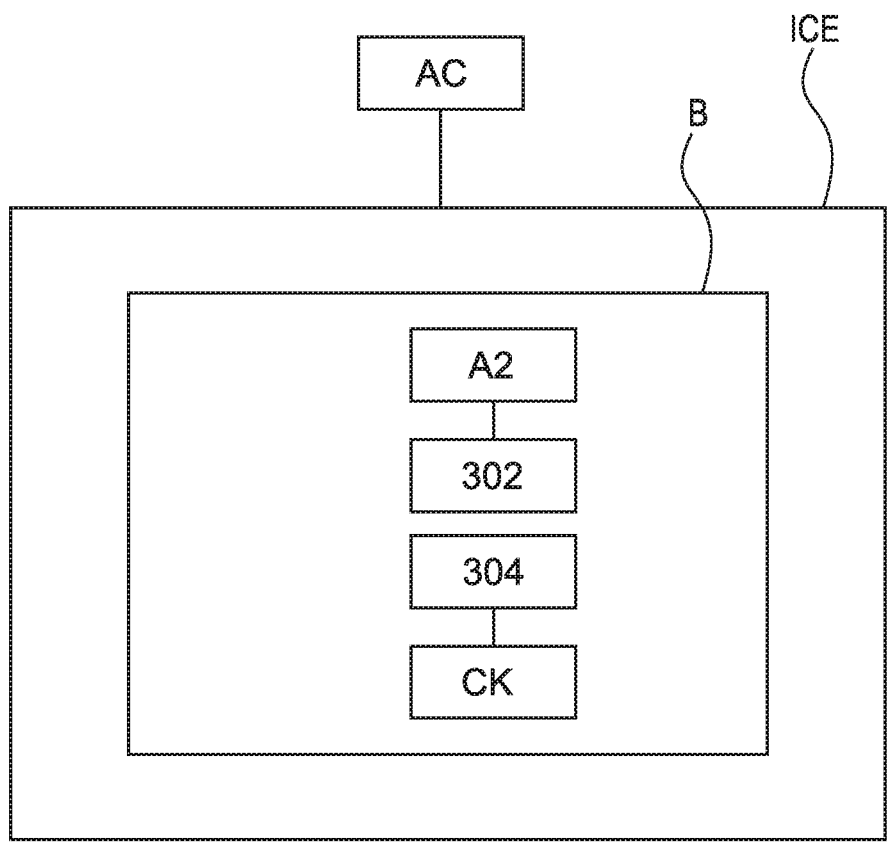
FIG. 9 is a block diagram of a magnetic engine vibration isolator on an engine block of an internal combustion engine.

FIG. 9 is a block diagram of magnetic engine vibration isolator 300 on an engine block of an internal combustion engine.

FIGS. 10A through 10J are schematic front views of the magnetic engine vibration isolator shown in FIG. 9 in respective circumferential positions for a crankshaft for the internal combustion engine. The following should be viewed in light of FIGS. 9 through 10J. It should be understood that the circumferential positions of crank magnet 304 in FIGS. 10A through 10J are example approximations for purposes of illustration. In the example of FIGS. 9 through 10J, isolator 300 includes: block magnet 302 arranged to be connected to block B for internal combustion engine ICE; and crank magnet 304 arranged to be connected to crankshaft CK for engine ICE.

In an example embodiment: block magnet 302 and crank magnet 304 are permanent magnets; block magnet 302 includes north pole N7 and south pole S7; and crank magnet 304 includes north pole N8 and south pole S8. In the example of FIGS. 10A through 10J: north pole N7 is radially outward, that is radially further from axis of rotation AR, than south pole S7; and south pole S8 is radially outward, that is radially further from axis of rotation AR, than north pole N8.

In the example of FIGS. 9 through 10J, block magnet 302 is arranged to be non-rotatably connected to block B, and crank magnet 304 is arranged to be non-rotatably connected to crankshaft CK. Block magnet 302 and crank magnet 304 are each disposed less than 360 degrees about axis of rotation AR in circumferential direction CD-1; therefore, block magnet 302 and crank magnet 304 are not radially aligned for every circumferential position of crankshaft CK. For example, in FIGS. 10A, 10B, 10D, and 10E, block magnet 302 and crank magnet 304 are not radially aligned, and in FIG. 10C, block magnet 302 and crank magnet 304 are radially aligned.

In FIGS. 10C through 10H, air gap 306 is present between block magnet 302 and crank magnet 304 in opposite radial directions RD-1 and RD-2. For example: in FIG. 10C, line L2, in radial direction RD-1, passes through in sequence: crank magnet 304; air gap 306; and block magnet without passing through axis AR; and in FIG. 10H, line L3, in radial direction RD-1, passes through in sequence: crank magnet 304; air gap 306; and block magnet without passing through axis AR. In an example embodiment, radial extent 308 of gap 306 is adjustable. In the example of FIGS. 9 through 10J, actuator A2 is arranged to displace block magnet 302 is direction RD-1 or RD-2 to increase or decrease extent 308, respectively. In general: decreasing gap 306 increases the magnetic torque produced by isolator 300; and increasing gap 306 decreases the magnetic torque produced by isolator 300. In an example embodiment (not shown), actuator A2 is arranged to displace magnet 304 to vary extent 308.

FIG. 11 is graph showing engine torque, magnetic torque, and combined engine torque and magnetic torque. The following should be viewed in light of FIGS. 9 through 11. In FIG. 11: torque is shown on the Y axis; the crank angle of crankshaft CK is shown on the X axis; curve 310 is based on FIGS. 10A through 10E; and curve 312 is based on FIGS. 10F through 10J. In FIG. 10H, extent 308 is greater than in FIG. 10C. Hence, the span of curve 310 along the X axis is greater than for curve 312; and the absolute values of the magnitude of torque for curve 310 is greater than for curve 312. Since block magnet 302 and crank magnet 304 do not extend 360 degrees about axis AR, curves 310 and 312 are not sinusoidal. That is, magnetic flux is not produced by isolator 300 across a full revolution of crankshaft CK.

In the example of FIGS. 9 through 10J, crankshaft CK rotates in direction CD-1. For curve 310: crank angle 314 is associated with FIG. 10A; crank angle 316 is associated with FIG. 10B; crank angle 318 is associated with FIG. 10C; crank angle 320 is associated with FIG. 10D; and crank angle 322 is associated with FIG. 10E. At crank angles 314, 318, and 322, magnetic flux is zero. Maximum positive magnetic flux is generated at crank angle 316, and maximum negative magnetic flux is generated at crank angle 320.

For curve 312: crank angle 324 is associated with FIG. 10F; crank angle 326 is associated with FIG. 10G; crank angle 318 is associated with FIG. 10H; crank angle 328 is associated with FIG. 10J; and crank angle 330 is associated with FIG. 10J. At crank angles 324, 318, and 330, magnetic flux is zero. Maximum positive magnetic flux is generated at crank angle 326, and maximum negative magnetic flux is generated at crank angle 328.

FIG. 10E illustrates crank angle span 330 associated with crank angles 312 and 322. In FIG. 10E, the position of magnet 304 in FIG. 10A is shown in phantom. FIG. 10J illustrates crank angle span 332 associated with crank angles 324 and 330. In FIG. 10J, the position of magnet 304 in FIG. 10F is shown in phantom. Span 332 has a greater radial extent than span 334.

Isolator 300 can be used to generate magnetic torque for selected portions of the cylinder firing cycle for engine ICE. For example, isolator 300 can be used to generate magnetic torque only for the span of crank angles associated with the firing of a cylinder in engine ICE. As is known in the art, the torque generated by the firing of a cylinder in engine ICE depends on the position of accelerator AC, with maximum torque associated with a full throttle position and minimum torque associated with an idle position. Therefore, air gap 306 is adjustable by actuator A2 to vary extent 308 to provide a desired magnetic torque to match a particular engine torque.

Although only a single isolator 300 is shown in FIGS. 9 through 11, it should be understood that more than one isolator 300 can in installed in a particular internal combustion engine. Multiple isolators 300 can be installed to address engine torque and subsequent vibration associated with multiple rotational positions of a crankshaft for the particular internal combustion engine.

Thus, rather than providing a "one size fits all" solution, isolator 300 selectively provides the optimum magnetic torque across the optimum span of crank angles for cancelling portions of the engine torque without an overly large magnitude of magnetic torque, which could exacerbate engine vibration. Further, isolator 300 generates nominal or negligible magnetic torque as a distance between magnets increases, for example during portions of the cylinder firing cycle in which magnetic torque is detrimental and would augment engine torque to increase engine vibration.

It should be understood that the north and south pole configurations shown in FIGS. 2A through 3; 6 through 7D; and 10A through 10J can be reversed. For example, in FIG. 6: the positions of N4, N5 and N6 can be switched with the positions for S4, S5 and S6, respectively; and the positions of S4, S5 and N6 can be switched with the positions for N4, N5 and N6, respectively.

In an example embodiment (not shown), magnets 102, 104, and 106 are axially, rather than radially, aligned with each other. By "axially aligned" we mean that a line parallel to axis AR passes through magnets 102, 104, and 106. The discussions for FIGS. 1 through 4 are broadly applicable to axially aligned magnets 102, 104, and 106.

In an example embodiment (not shown), magnets 202, 204, and 206 are axially aligned with each other. The discussions for FIGS. 5 through 8B are broadly applicable to axially aligned magnets 202, 204, and 206.

In an example embodiment (not shown), magnets 302 and 304 are axially aligned with each other. The discussions for FIGS. 9 through 11 are broadly applicable to axially aligned magnets 302 and 304.

In an example embodiment (not shown), any or all of the magnets discussed in FIGS. 1 through 11 are electromagnets. Power supplied to the one or more electromagnets is varied to control a magnitude of magnetic torque produced by the respective isolator including the one or more electromagnets. For example, the variation in magnetic torque due to the circumferential displacement of magnet 204 in isolator 200 is implemented by: making magnet 204 an electromagnet fixed to block B; and electrically varying the magnetic field generated by magnet 204 instead of rotating magnet 204 with respect to block B. For example, in isolator 300, one of magnets 302 or 304 is an electromagnet. Then, rather than varying extent 308 of gap 306 to control magnetic torque produced by isolator 300, gap 306 is fixed and the power to the electromagnet is varied to control the magnetic field produced by the electromagnet and the magnetic torque produced by isolator 300.

In an example embodiment (not shown), any or all of the axially aligned magnets discussed above are electromagnets.

It should be understood that other combinations of radially aligned magnets, axially aligned magnets, and displaceable magnets, such as magnet 204 or magnet 302 are possible. For example, magnet 204 can be an electromagnet and be circumferentially displaceable.

In an example embodiment (not shown), an isolator has only a single magnet attracted to a magnetic element, such as an iron tooth, on block B or crankshaft CK. In an example embodiment (not shown), the single magnet is: radially alignable with the magnetic element or axially alignable with the magnetic element. In an example embodiment (not shown), the single magnet is a permanent magnet or an electromagnet.

Isolators 100, 200, and 300, and the example embodiments not shown and discussed above, are applicable to engine ICE firing an even number of cylinders. In an example embodiment (not shown), one of isolators 100, 200, and 300, or one of the example embodiment isolators, not shown and discussed above, is connected to a geared, chain driven, or belt driven shaft, rather than connected directly to crankshaft CK. Connection to a geared, chain driven, or belt driven shaft enables use of the isolator with an odd number of fired cylinders.

It will be appreciated that various of the above-disclosed and other features and curves, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS 10 cylindrical system
11 axis of rotation
AD1 axial direction
AD2 axial direction
RD1 radial direction
RD2 radial direction
CD1 circumferential direction
CD2 circumferential direction
R radius
12 object
13 object
14 object
15A surface
15B surface
15C edge
16A surface
16B edge
17A radius
17B radius
18 surface
19 circumference
20 radius
AR axis of rotation
A1 actuator
A2 actuator
AC accelerator
B engine block
CD-1 circumferential direction
CD-2 circumferential direction
CK crankshaft
ICE internal combustion engine
L1 line
L2 line
L3 line
N1-N8 north pole
S1-S8 south pole
100 magnetic engine vibration isolator
102 block magnet
104 block magnet
106 crank magnet
108 engine torque curve
110 magnetic torque curve
112 combined engine and magnetic torque
114 crank angle
116 crank angle
118 crank angle
120 crank angle
122 crank angle
124 crank angle
126 crank angle
128 crank angle
200 magnetic engine vibration isolator
202 block magnet
204 block magnet
206 crank magnet
210 magnetic torque curve
212 combined engine and magnetic torque
214 crank angle
216 crank angle
218 crank angle
220 crank angle
222 crank angle
224 crank angle
300 magnetic engine vibration isolator
302 block magnet
304 crank magnet
306 air gap
308 radial extent of air gap
310 magnetic torque curve
312 combined engine and magnetic torque
314 crank angle
316 crank angle
318 crank angle
320 crank angle
322 crank angle
324 crank angle
326 crank angle
328 crank angle
330 crank angle
332 crank angle span
334 crank angle span

The invention claimed is:

1. A magnetic engine vibration isolator, comprising:
at least one block magnet arranged to be connected to a block for an internal combustion engine; and,
a crank magnet arranged to be connected to a crankshaft for the internal combustion engine, wherein for a first circumferential position of the crankshaft about an axis of rotation for the crankshaft, the at least one block magnet and the crank magnet are aligned, wherein the at least one block magnet includes a first block magnet and a second block magnet.

2. The magnetic engine vibration isolator of claim 1, wherein for the first circumferential position of the crankshaft about the axis of rotation for the crankshaft, the at least one block magnet and the crank magnet are radially aligned.

3. The magnetic engine vibration isolator of claim 1, wherein for any circumferential position of the crankshaft about the axis of rotation, the at least one block magnet and the crank magnet are radially aligned.

4. The magnetic engine vibration isolator of claim 1, wherein:
the at least one block magnet is arranged to be non-rotatably connected to the block; and,
the crank magnet is arranged to be non-rotatably connected to the crankshaft.

5. The magnetic engine vibration isolator of claim 1, wherein:
the at least one block magnet is disposed 360 degrees about the axis of rotation; and,
the crank magnet is disposed 360 degrees about the axis of rotation.

6. The magnetic engine vibration isolator of claim 1, wherein
the crank magnet is radially disposed between the first block magnet and the second block magnet.

7. The magnetic engine vibration isolator of claim 1, wherein:
the first block magnet includes a first north pole;
the second block magnet is located radially outwardly of the first block magnet and includes a second north pole;
the first north pole is radially aligned with the second north pole; and,
the crank magnet is radially disposed between the first block magnet and the second block magnet.

8. The magnetic engine vibration isolator of claim 1, wherein:
- the first block magnet is arranged to be non-rotatably connected to the block; and,
- the second block magnet:
  - is located radially outwardly of the first block magnet; and,
  - is arranged to be circumferentially displaceable, by an actuator, with respect to the first block magnet.

9. The magnetic engine vibration isolator of claim 8, wherein the crank magnet is:
- disposed between the first block magnet and the second block magnet; and,
- arranged to be non-rotatably connected to the crankshaft.

10. The magnetic engine vibration isolator of claim 8, wherein:
- for a full throttle position of an accelerator for the internal combustion engine, the second block magnet is arranged to be rotated by the actuator to a first circumferential position with respect to the first block magnet; and,
- for a first throttle position of the accelerator other than the full throttle position of the accelerator, the second block magnet is arranged to be rotated by the actuator to a second circumferential position, different from the first circumferential position, with respect to the first block magnet.

11. The magnetic engine vibration isolator of claim 1, wherein:
- the first block magnet is arranged to be disposed less than 360 degrees about the axis of rotation for the crankshaft; and,
- the crank magnet is arranged to be:
  - non-rotatably connected to the crankshaft; and,
  - disposed less than 360 degrees about the axis of rotation.

12. The magnetic engine vibration isolator of claim 11, wherein:
- the first block magnet includes a south pole and a north pole;
- the crank magnet includes a south pole and a north pole;
- the south pole of the crank magnet is radially further from the axis of rotation than the north pole of the crank magnet; and,
- the south pole of the first block magnet is radially closer to the axis of rotation than the north pole of the first block magnet.

13. The magnetic engine vibration isolator of claim 11, wherein:
- in a first circumferential position of the crank magnet with respect to the first block magnet, a line, in a radial direction orthogonal to the axis of rotation, passes through in sequence: the crank magnet; an air gap; and the first block magnet; and,
- the first block magnet is arranged to be radially displaceable by an actuator to change an extent of the air gap.

14. A magnetic engine vibration isolator, comprising:
- a first block magnet arranged to be:
  - connected to a block for an internal combustion engine; and,
  - extend about an axis of rotation for a crankshaft for the internal combustion engine;
- a second block magnet arranged to be:
  - connected to the block; and,
  - extend about the axis of rotation; and,
- a crank magnet:
  - arranged to be connected to the crankshaft; and,
  - disposed between the first block magnet and the second block magnet.

15. The magnetic engine vibration isolator of claim 14, wherein at least respective portions of the first block magnet, the second block magnet, and the crank magnet are radially aligned.

16. The magnetic engine vibration isolator of claim 14, wherein:
- the first block magnet and the second block magnet are arranged to be non-rotatably connected to the block; and,
- the crank magnet is arranged to be non-rotatably connected to the crankshaft; or, wherein:
- the first block magnet is arranged to be non-rotatably connected to the block;
- the crank magnet is arranged to be non-rotatably connected to the crankshaft; and,
- the second block magnet is arranged to be displaceable, by an actuator and in a circumferential direction, with respect to the first block magnet.

17. A magnetic engine vibration isolator, comprising:
- a block magnet arranged to:
  - be displaceable by an actuator;
  - be non-rotatably connected to a block for an internal combustion engine; and,
  - extend less than 360 degrees, in a circumferential direction, about an axis of rotation for a crankshaft for the internal combustion engine; and,
- a crank magnet arranged to:
  - be non-rotatably connected to the crankshaft; and,
  - extend less than 360 degrees, in the circumferential direction, about the axis of rotation.

18. The magnetic engine vibration isolator of claim 17, wherein for a first circumferential position of the crankshaft, a line, orthogonal to the axis of rotation and not passing through the axis of rotation, passes through the crank magnet and the block magnet.

19. The magnetic engine vibration isolator of claim 17, wherein:
- in a first circumferential position of the crank magnet with respect to the block magnet, a line, in a radial direction orthogonal to the axis of rotation, passes through in sequence: the crank magnet; an air gap; and the block magnet; and,
- the block magnet is arranged to be radially displaceable by the actuator to change an extent of the air gap in the radial direction.

* * * * *